United States Patent
Koakutsu et al.

[11] Patent Number: 6,031,976
[45] Date of Patent: Feb. 29, 2000

[54] PRINTING APPARATUS INCLUDING PRINT IMAGE STORAGE AND CONTROL METHOD THEREFOR

[75] Inventors: Naohiko Koakutsu; Takuya Hyonaga, both of Suwa, Japan

[73] Assignee: Seiko Epson Corporation, Tokyo, Japan

[21] Appl. No.: 08/729,267

[22] Filed: Oct. 10, 1996

[30] Foreign Application Priority Data

Oct. 13, 1995 [JP] Japan ................................. 7-265878

[51] Int. Cl.[7] .............................. B41B 15/00; B41J 5/30; B41J 11/44
[52] U.S. Cl. ........................ 395/115; 395/115; 395/114; 395/117; 400/68; 400/76
[58] Field of Search ................................ 395/115, 114, 395/117; 400/68, 76

[56] References Cited

U.S. PATENT DOCUMENTS

| 5,104,245 | 4/1992 | Ouguri et al. ........................... 400/68 |

FOREIGN PATENT DOCUMENTS

| 0 217 447 | 4/1987 | European Pat. Off. ....... G06K 15/02 |
| 0 310 712 | 4/1989 | European Pat. Off. . |
| 55-52183 | 4/1980 | Japan . |
| 60-126730 | 7/1985 | Japan . |
| 61-58770 | 3/1986 | Japan . |
| 63-188076 | 8/1988 | Japan . |
| 63-297082 | 12/1988 | Japan . |
| 4-1068 | 1/1992 | Japan . |
| 62-82388 | 10/1994 | Japan . |
| WO 88/01768 | 3/1988 | WIPO . |
| WO 93/01565 | 1/1993 | WIPO . |

Primary Examiner—Edward L. Coles
Assistant Examiner—Twyler Lamb

[57] ABSTRACT

In order to offer a printer capable of high throughput printing even when the same printing or printing that is partially different is repeated, the printing apparatus of present invention equipped with a storage unit for storing print image data based on print data received from the host device in a designated position and a printing controller and printer engine that performs print processing on the recording medium based on the print image data stored in the storage unit in accordance with control data received from the host device. Specifically, this printing apparatus features an erasure unit for selectively deleting print image data that has undergone the print processing from the storage unit in accordance with control data received from the host device. Also, the printing controller is preferably configured such that it performs the print processing in accordance with first and second types of control data, such that the erasure unit performs erasure processing in accordance with the first control data and does not perform erasure processing in accordance with the second control data.

18 Claims, 10 Drawing Sheets

PRINTING APPARATUS INCLUDING PRINT IMAGE STORAGE AND CONTROL METHOD THEREFOR

BACKGROUND OF THE INVENTION

1. Field of the Invention

The present invention is generally related to printing devices having a storage unit which can selectively retain print image data generated from printing commands and data received from an external host. More particularly, this invention is concerned with printing apparatus that uses locally retained print image data to perform repetitive printing operations in a time and resource efficient manner.

2. Description of the Related Art

So-called point-of-sale ("POS") or terminal printers develop print data received from a host device such as a personal computer, in the form of character codes and/or graphic language data. In turn, the information processor of such a printer converts the print data into corresponding image data specifically tailored for recording unit requirements. The image data, typically divided in page-wise or row-wise units known as bands, is stored in an image buffer for subsequent retrieval and use by the recording unit in order to physically reproduce the desired text and/or image specified by the received print data. The development of print image data from character codes is normally done by referring to a character generator, and the development of graphic data is performed by referencing prescribed drawing algorithms, as is well-known in the art. Also, in conventional terminal printers, the recording position in the image buffer is determined by position data received prior to transmission of the actual print data. It should be noted here that this processing takes substantial amount of time and processing overhead to complete, especially when vast amounts of data are received from the host.

In these conventional terminal or POS printers, print image data which has fully utilized by the recording unit or print engine in producing the desired print transaction is automatically "erased" from the image from the image buffer (note here that a single print transaction may involve anywhere from printing a single item of text or graphics on a pre-printed form up to multiple copies of identical information onto full-size recording sheets). Stale image data is entirely erased (i.e. flushed or cleared-out), not merely overwritten, in order to prevent image blending or superposing of new image information onto old when the new image data does not completely overwrite the contents of the image buffer.

However, automatically flushing the image buffer after every transaction requires that, subsequent to flushing, that the host computer again download all the required print data to the POS or terminal printer, and the printer develop and store it as corresponding image data before the print engine can again resume printing. As noted above, these tasks require significant intercommunication activity, host and printer processing overhead, and time to complete, even when only slight changes are made between transactions. This results in uniformly poor throughput, extensive printing delays and slow system responsiveness.

Moreover, in recent years, there has been demand to improve the throughput of these printers, particularly in the POS and ECR markets. Sales proprietors and clerks are faced with ever more complex and lengthy recordation tasks, and customer's patience wears thin as the technology is more widely adopted in the marketplace. Because the actual recording stage of the printing process is quite mature technologically, any realized speed improvement therein is incremental at best. Thus, the printer industry is focused ways to shorten the time lag between initiation of the printing process within the host computer until physical recording starts. Conventional approaches include adopting higher-speed host-printer communications and/or more powerful and faster rendering engines, but these solutions require significant additional hardware costs which cannot be passed onto an increasingly cost-conscious market. In other words, the marketplace demands ways to shorten the time in which print image data is developed as well as minimize unnecessary data transmission and processing tasks involving the host computer and/or printing apparatus. Yet, there is, of course, the overriding concern to keep printer operation simple and cost-effective for the user.

OBJECTS OF THE INVENTION

It is, therefore, an object of the present invention to solve the aforementioned problems.

It is yet a further object of the present invention to provide a printer capable of realizing high throughput and efficient printing when printing tasks are repetitive or vary only slightly.

It is still a further object of the present invention to provide a printer capable of lightening communication and processing burdens on the host computer yet remain easy to use and implement.

SUMMARY OF THE INVENTION

In accordance with this and related objects, the printing apparatus of present invention includes a storage unit for storing print image data in a designated position based on print data received from the host device, a printing unit that performs print processing on the recording medium in accordance with control data received from the host device based on the print image data stored in the storage unit, and an erasure unit which selectively deletes image data from the storage unit upon completion of a given printing transaction. In particular, this erasure unit selectively erases print image data that has undergone the print processing from the storage unit, preferably in accordance with control data received from the host device which looks ahead to the next transaction to determine whether a threshold degree of similarity exists. When print image data is deemed by the host to be used again, the host device broadcasts appropriate control data to the erasure unit forcing it to not erase the image data. Likewise, when retained image data need not be reused, the host device may issue control data to authorize erasure thereof by this erasure unit.

Further, an area designator printer component may be used to designate a varying subset of image data or image region which will change between transactions, along with a second erasure unit that erases print image data specified for such image regions in accordance with control data and print transaction comparisons made by the host. Therefore, since it is possible to selectively designate and erase one or more subsets of retained image data and replace it with revised image data corresponding to the new transaction, host intervention and print data retransmission activities are minimized.

Therefore, according to the present invention, after one page of print data sent from the host computer is developed into print image data and printed, the same print image data or partially changed or appended image data can be used to perform subsequent print processing without requiring a full page refresh from the host, or reinterpretation by the image data converter or rendering engine of the printing apparatus. Therefore, a high-throughput printer can be offered which reduces the processing burden on the host computer and offering the user an easy-to-use printer because the host specifies what information needs to be erased.

Other objects and attainments together with a fuller understanding of the invention will become apparent and appreciated by referring to the following description of specific preferred embodiments and claims, taken in conjunction with the accompanying drawings.

BRIEF DESCRIPTION OF THE DRAWINGS

In the drawings, wherein like symbols refer to like parts.

DETAILED DESCRIPTION OF THE PREFERRED EMBODIMENTS

Below, embodiments of the present invention are explained in reference to the accompanying drawings.

Figure 1:
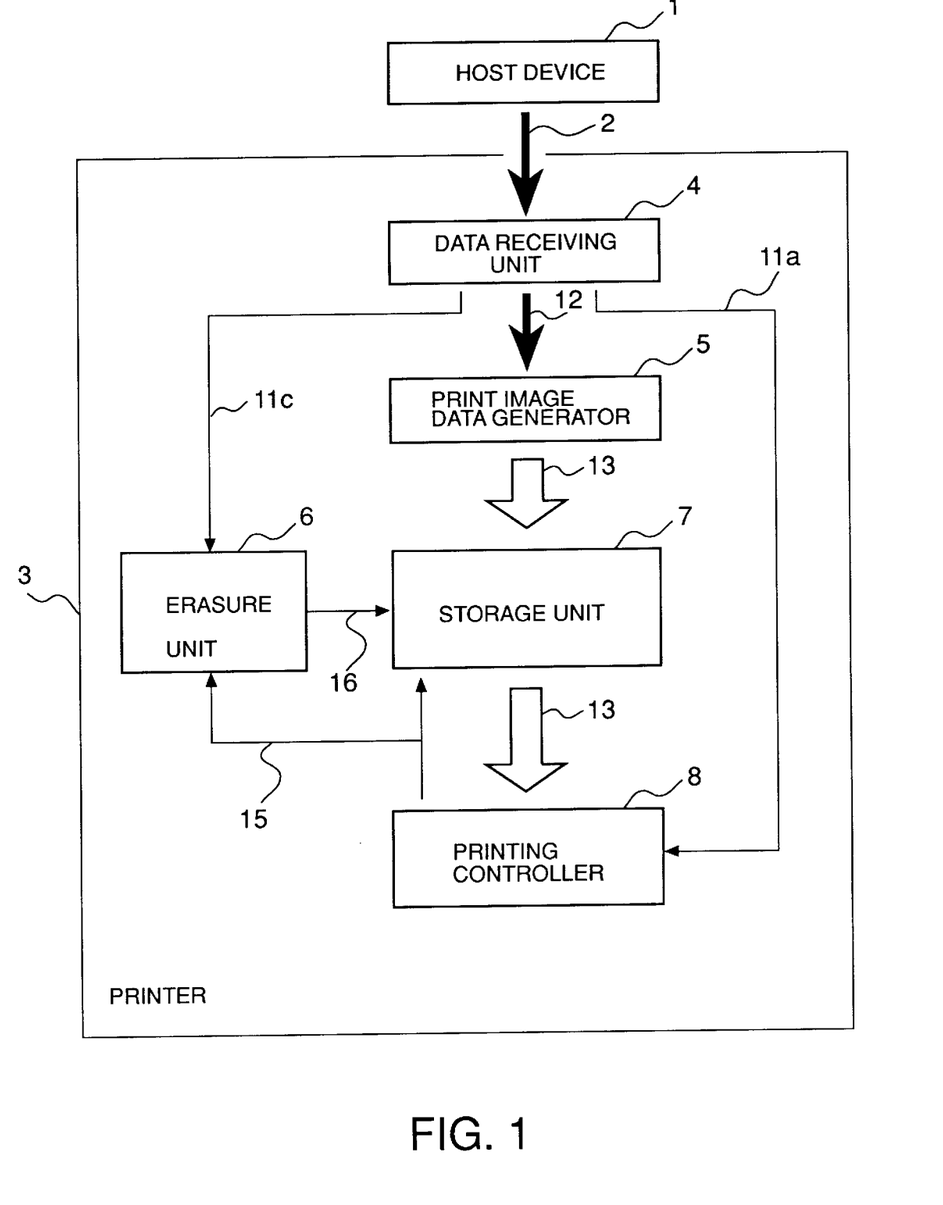
FIG. 1 is a functional block diagram of the printing apparatus according to the first embodiment of the present invention.

FIG. 1 is a block diagram representing the functions of the printer of the first embodiment of the present invention. Host device 1 is preferably a general-purpose information processing device such as a personal computer that performs various types of information processing. It control the desired print processing to be performed corresponding to the results of information processing within the printer 3 by sending data 2, which includes print data and control data, to data receiving unit 4 of printer 3 via an interface signal line 110 (see FIG. 2).

Printer 3 functionally comprises data receiving unit 4, print image data generator 5, erasure unit 6, storage unit 7 and printing controller 8. Control data comprises data for controlling the printer and may include control commands and their associated parameters, as is well known in the art. These control commands will be referred to hereinafter simply as commands.

Data receiving unit 4 receives data 2 sent from host device 1, distinguishes between commands 11 and print data 12 and also analyzes commands 11. Print data 12 are sent to print image data generator 5 and commands 11 are sent to a processor unit (5, 6, or 8) corresponding to the perceived interpretation by the data receiving unit.

Print image data generator 5 generates print image data 13 based on print data 12 received from data receiving unit 4 and stores it in storage unit 7. More specifically, character codes provided as print data are sent to the character generator (not shown in the drawings), and those character patterns which are the output thereof are sent to storage unit 7 together with prescribed position information generated according to the print position data constituting part of print data 12.

Storage unit 7 stores print image data 13 sent from print image data generator 5 to the prescribed position based on such position information. Print image data 13 is retrieved in accordance with the read request from print controller 8 described in more detail hereinbelow. Further, stored print image data 13 is erased in accordance with erasure request 16 from erasure unit 6.

It should be noted here that erasure does not include so-called "overwriting" functionality and also that print image data are not stored at the same time as erasure is performed, according to the presently preferred embodiments.

Print controller 8 sends read request 15 for print image data to storage unit 17 in accordance with print processing command 11. Then, print image data 13 read out from the prescribed position in storage unit 7 is printed at a location on the recording medium corresponding to this prescribed position. Of course, a well-known print engine mechanism is included in the printer 3 that causes relative movement between the print head and the recording medium in order to print at the prescribed position on the recording medium as specified by printing controller 8.

Erasure unit 6 references read request 15 to the storage unit from print controller 8 and detects whether print image data 13 in the storage unit has been previously read out for print processing in accordance with the present print transaction. Also, when a storage unit read has been detected by erasure unit 6, erasure request 16 is output to storage unit 7 in accordance with erasure mode selection command 11c from data receiving unit 4. That is, if erasure has been disabled by erasure mode selection command 11c, erasure request 16 is not output, but if erasure is allowed by this command, then a erasure request 16 is output. Erasure request 16 can be output after all of print image data 13 are read out from storage unit 7, or when some of the print image data are read, it can be generated concurrently with data positioning.

Figure 2:
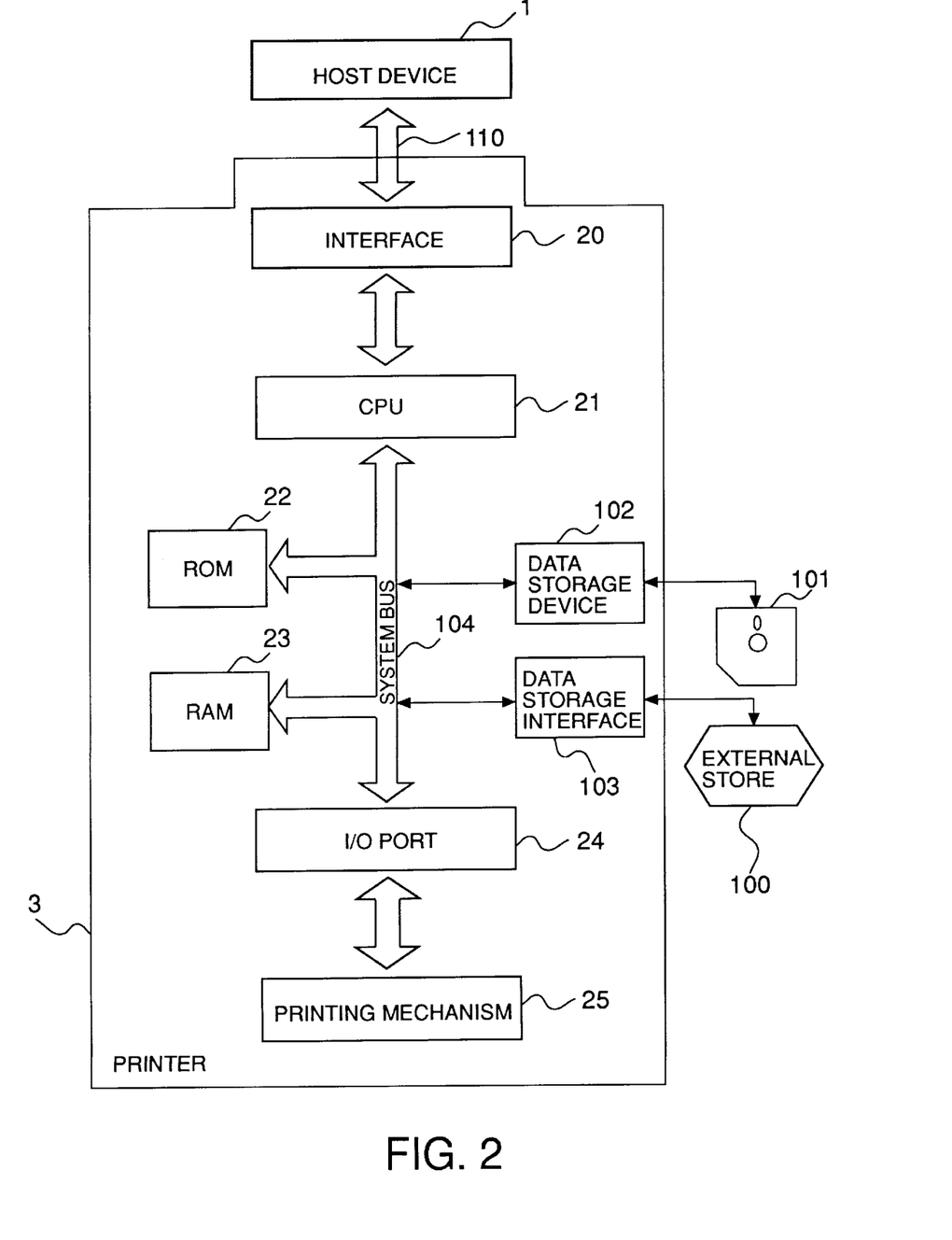
FIG. 2 is a circuit block diagram of the printing apparatus of FIG. 1.

Next is an explanation of the circuit configuration of the printer of this embodiment. FIG. 2 is a block diagram showing the configuration of the printer circuit of this embodiment. The control circuit of printer 3 comprises interface 20 for communicating with host device 1, central processing unit ("CPU") 21 which controls the electric power and electronic elements of printing mechanism 25 and detects their state via I/O port 24, ROM 22 which stores the program that determines the operating sequences of the CPU, and RAM 23 which also stores part of the routines dedicated to print processing, along with moving up part of storage unit 7.

Figure 9:
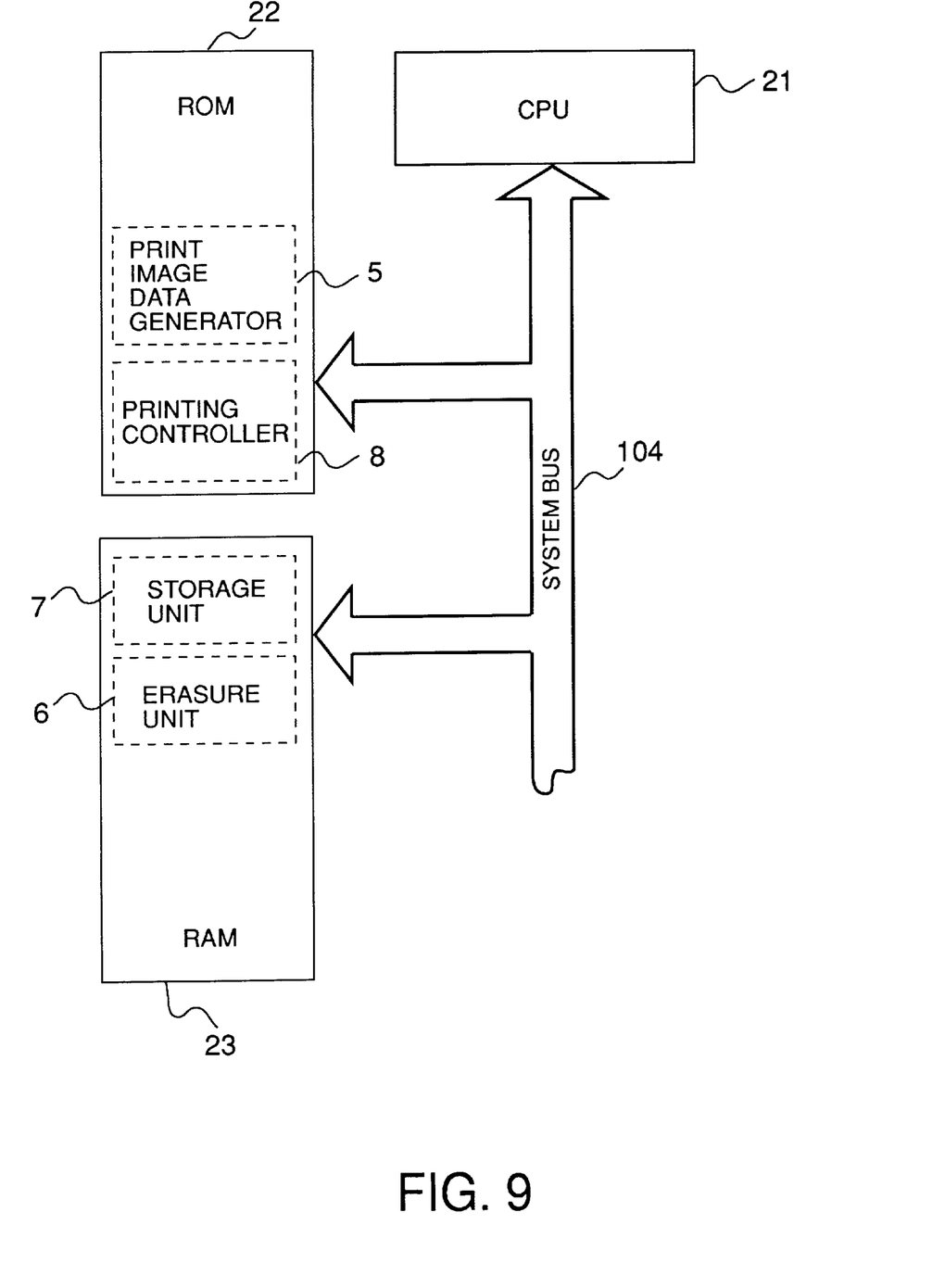
FIG. 9 is a more detailed partial block diagram illustrating placement of the functional units of the printing apparatus of FIGS. 1 and 5 within the printer memories of FIG. 2.

In this embodiment, almost all of the function blocks in FIG. 1 above are realized by CPU 21 in tandem with one or more physical printer memories 22 and 23. As shown in FIG. 2 and FIG. 9, data receiving unit 4 comprises interface 20 and CPU 21, print image data generator resides in ROM 22, which contains a character generator, executable by CPU 21, storage unit 7 comprises RAM 23, which includes the so-called image buffer addressable by CPU 21, the erasure unit resides in RAM 23 executable by CPU 21, and the print controller 8 of FIG. 1 collectively includes CPU 21, I/O port 24 and printing mechanism 25.

It should be also noted here that the components of this invention, including but not limited to the erasure unit 6 (or second erasure unit 10, see hereinbelow with reference FIG. 7), print image data generator 5, and area recognizer 9 (see hereinbelow with reference to FIG. 7) can be conveniently implemented using a conventional general purpose digital computer serving as CPU 21 of the printing apparatus, programmed according to the teachings of the specification, as will be apparent to those skilled in the computer arts. Appropriate software coding can be readily prepared based on the teachings of the present disclosure, as will be apparent to those skilled in the software art. The present invention may also be implemented by the preparation of application specific integrated circuits or by interconnecting an appropriate network or conventional component devices and circuits, as will be readily apparent to those skilled in the art.

More specifically, in each of the following preferred embodiments of the present invention, including but not limited to, the first embodiment, the erasure unit 6, the data receiving unit 4, the print image data generator 5, and the printing controller 8 may all take the form of independent threads executing on CPU 21 shown in FIG. 2. These threads permit the CPU 21 to carry out the selective print data erasure and reuse techniques of the preferred embodiments when the CPU 21 reads and executes the corresponding programming instructions from a computer readable storage medium, either transient or permanent in nature. The storage medium containing the thread instructions can include, but is not limited to any type of disk media including floppy disk 101 attached to data storage device 102, optical disks, CD ROMS, magneto-optical disks, hard drives or disk arrays whether located within or external to printer 3. Alternatively, the storage medium can include ROM 22, RAM 23, EPROM, EEPROM, Flash EEPROM or any other type of media suitable for storing computer readable instructions.

Figure 3:
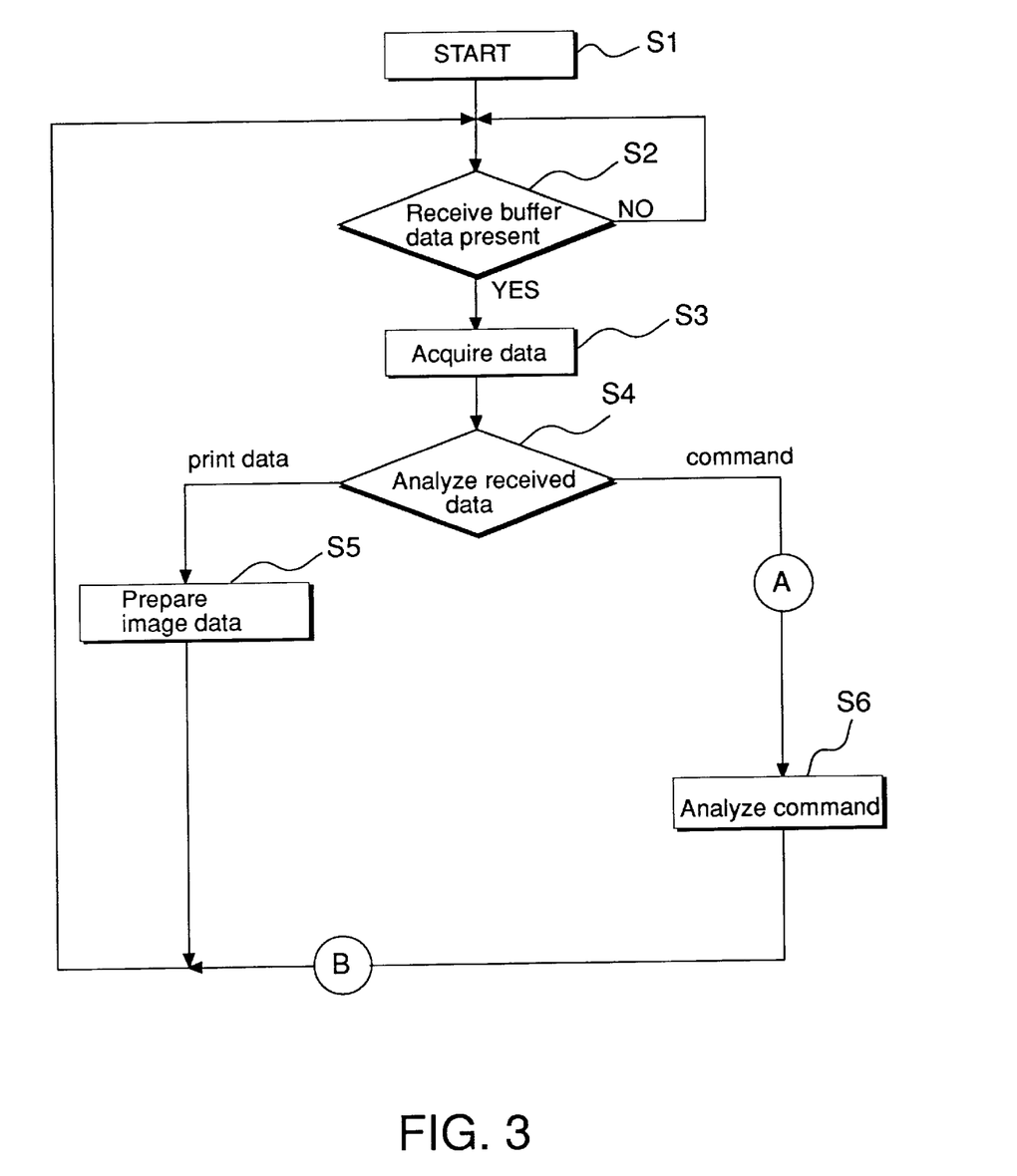
FIG. 3 is a flowchart outlining selective erasure processing performed by CPU 21 of FIG. 2.

The operation for each of the functional elements and threads of CPU 21 is explained hereinbelow using FIGS. 3 and 4. FIG. 3 is a general flowchart summarizing print processing by CPU 21. In step S1, the power source of the printer is turned on and the entire printer is initialized. That is, following initialization of CPU 21, the control circuit is checked for proper operation; e.g., printing mechanism 25 is initialized by moving the print head to the home position, etc., RAM 23, which stores the print image data, is initialized, and the host device is notified of the printer's ready state. This processing is also performed at the time of reset resulting from operating a conventional reset switch not shown herein.

Next, in step S2, the receive buffer of interface 20 is checked to determine if there is control or print data 2 present on signal line 120. The receive buffer is built into interface 20, and data received according to a prescribed communication procedure with host device 1 is buffered in. In this embodiment, well-known RS-232C protocols are used for the interface with the host device. If there is no data 2 in the receive buffer, then processing loops back to step S2. If, however, there is data 2 ready for processing, then this data is acquired in step S3. Also, acquired data 2 are analyzed in step S4 and identified as either print data 12 or command 11. Also, as described below, command 11 is further analyzed in step S6 (or steps S41, 42 discussed hereinbelow). Processing up to this point is preferably handled by data receiving unit 4 of FIG. 1.

If the data is judged as print data 12 in data analysis in step S4, then corresponding print image data 13 is generated in a known manner and stored in image buffer 7a mentioned below in step S5. This processing is handled by print image data generator 5 and storage unit 7, as shown in FIG. 1.

Figure 8:
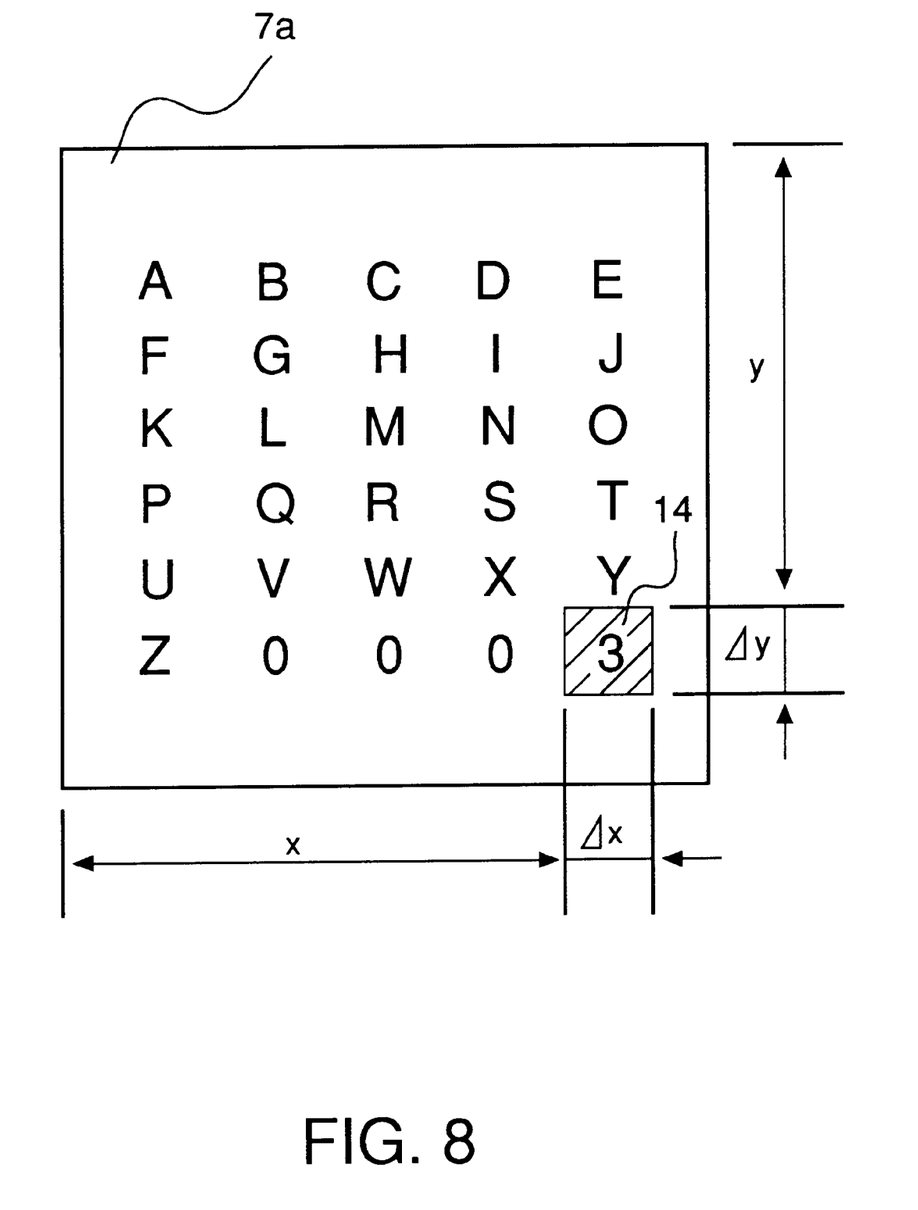
FIG. 8 diagrammatically shows storage of print image data according to the preferred embodiments of the present invention.

An example of this processing is explained next using FIG. 8. FIG. 8 is a diagram illustrating a sample storage state of print image data according to the present invention. In the figure, 7a refers to the image buffer disposed in RAM 23. Development of the bit patterns of the characters, which are the print data in image buffer 7a is explained hereinbelow.

FIG. 8 shows the result of developing print image data 13 in image buffer 7a when the print data and format control codes "A, B, C, D, E, LF, F, G, H, I, J, LF, K, L, M, N, O, LF, P, Q, R, S, T, LF, U, V, W, X, Y, LF, Z, 0, 0, 0, 3" are sent in sequence from host device 1. Here, "LF" is a format control code indicating line feed and is represented in hexadecimal notation as 0AH. In this embodiment, a total of 35 bytes of data (30 bytes of print data and 5 bytes of format control codes) are sent from the host computer.

Figure 4:
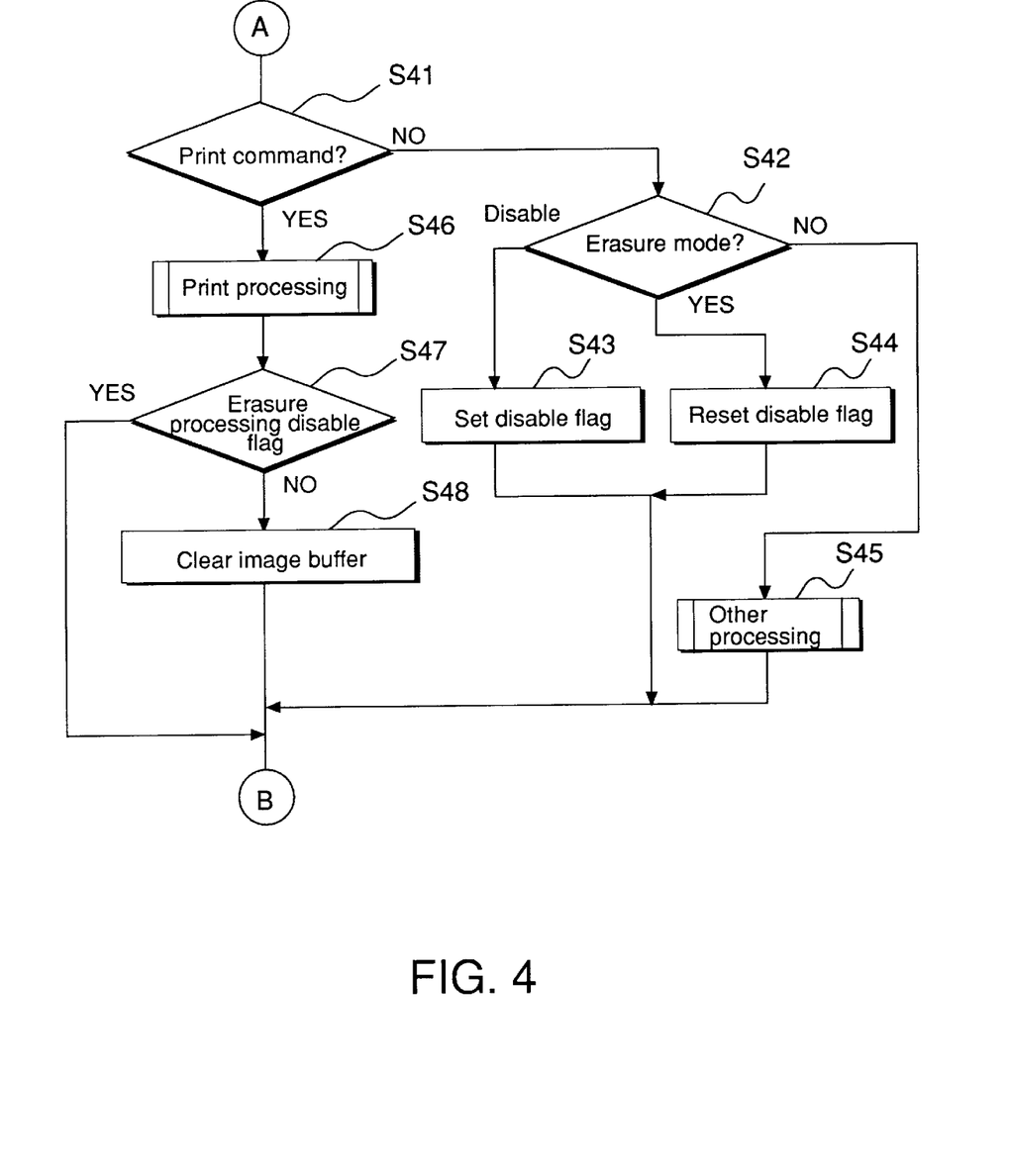
FIG. 4 is a flowchart showing the processing of command 11 shown in step S6 of the flowchart of FIG. 3.

FIG. 4 is a flowchart describing the processing of command 11 in step S6. From step S4 (FIG. 3) control passes to step S41, in which command 11 is judged whether or not it is print command 11a. If it is not print command 11a, then it is judged whether or not it is erasure mode selection command 11c in step S42. If it is not erasure mode selection command 11c, then further analysis of the command and its processing; (e.g. loading of the recording medium in the printer,) are performed in step S45 in a conventional manner.

If, however, in step S42, the perceived command is judged to be the erasure mode selection command, then the erasure mode is instead set according to the selection. In this embodiment, if it is not a mode that performs erasure, then the erasure disable flag is set, and if it is a mode that performs erasure, then this flag is reset. This erasure disable flag will be referenced in step S47 upon completion of print processing in step S46 described below.

If, in step S41, the received control data is judged to be a print command, then conventional print processing is performed in step S46. This print processing involves the print controller 8 of FIG. 8.

When print processing step S46 is complete, the state of the erasure disable flag mentioned above is examined. If the erasure disable flag is in a reset state, i.e., mode that performs erasure is selected, then the image buffer disposed in RAM 23 is cleared out or flushed, wherein a known "null" value is written to each memory location forming the image buffer. Step S42 to step S44 and step S47 involve the erasure unit 6 of FIG. 1. Also, step S48 directly involves CPU 21 and storage unit 7.

Since a configuration is used wherein the erasure mode is selected in this way, data that has been sent once and developed into print image data can be used in print processing a plurality of times without erasing it by sending a print command after selecting the erasure disable mode. Further, when updating the data to new print data, the image buffer can be cleared in advance by sending a print command after selecting the erasure enable mode in print processing performed prior to this print processing with the new print data. Therefore, by sending only print data of those areas that need to be printed, printing without noise caused by remaining previous print image data is possible.

Figure 5:
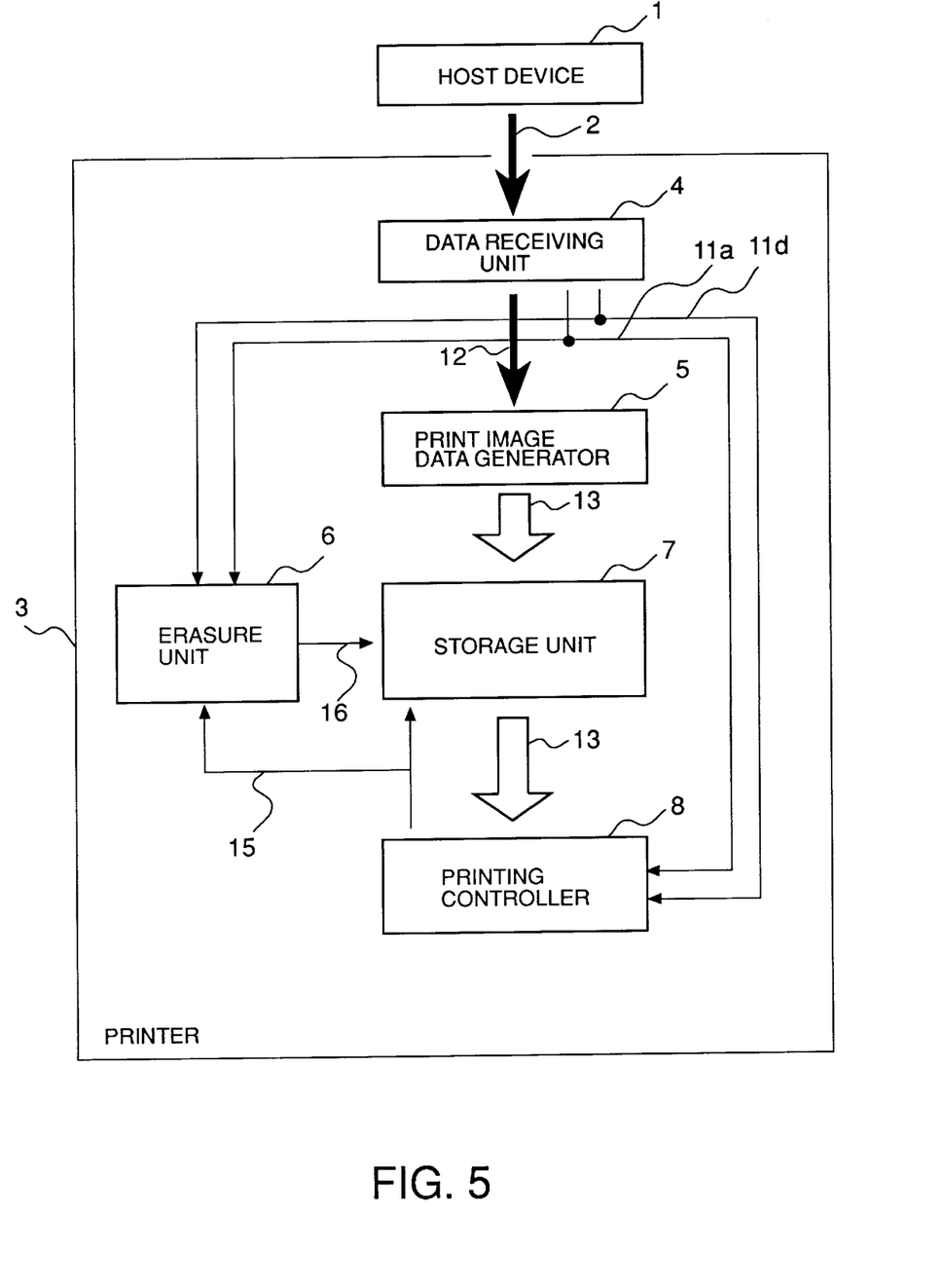
FIG. 5 is a functional block diagram of a printing apparatus according to the second embodiment of the present invention.
Figure 6:
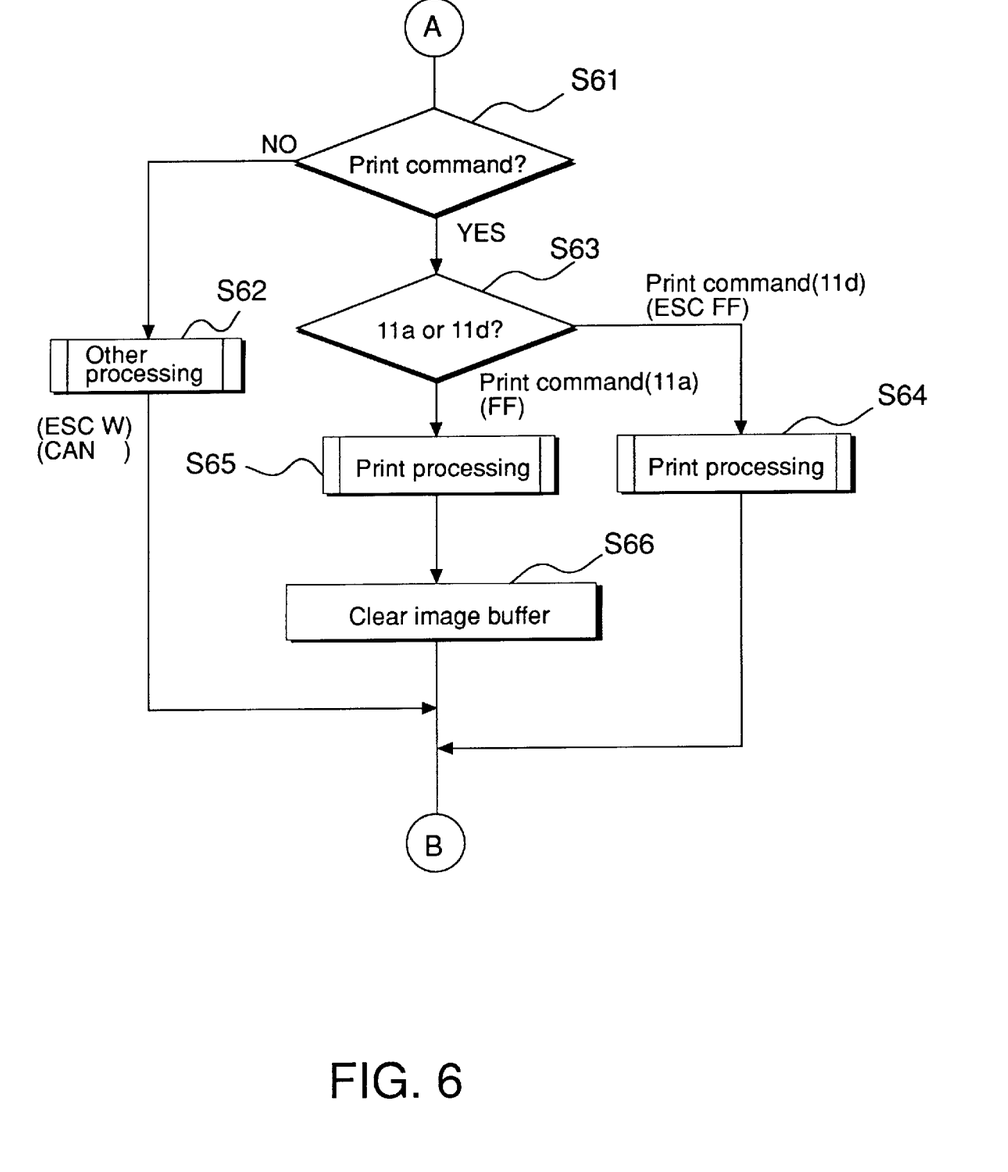
FIG. 6 is a flowchart showing control data command processing according to the embodiment of FIG. 5.

Next, the second embodiment of present invention is explained using FIGS. 5 and 6. FIG. 5 is a function block diagram of the second embodiment of the present invention. In this embodiment, two types of print commands 11a and 11d are identified in data receiving unit 4 and are input to print controller 8 and erasure unit 6, and erasure mode selection command 11c used in the first embodiment is eliminated.

Print controller 8 performs the same print processing for both of the two types of print commands described above. That is, read request 15 for the print image data in storage unit 7 is performed, and print image data 13 read out from the prescribed position in storage unit 7 is printed at a position on the recording medium corresponding to that prescribed position.

The difference between this embodiment and the first embodiment is in the operation of the erasure unit 6. That is, the erasure unit sets the erasure enable mode in response to print command 11a (corresponds to command code "FE" described below) and sets the erasure disable mode in response to print command 11d (command code "ESC EF" described below). A detailed explanation is given below with reference to FIG. 6.

FIG. 6 is a flowchart describing the command processing corresponding to step S6 in the flowchart in FIG. 3 summarizing the operation of the CPU 21 the second embodiment of present invention. In step S61, the command is judged whether or not it is a print command. If it is not a print command, then processing corresponding to the various commands is performed in step S62. For example, the image buffer area designation command (ESC W) or the image buffer clear command (CAN) described below may be executed here by CPU 21.

If the command is judged to be a print command in step S61, then the command is examined in step S63 to determine which of two types of print commands it is. If it is print command 11d, i.e., command code is "ESC FF" (hexadecimal 1BH 0CH), then print processing is performed in step S64, but the image buffer is not cleared upon completion of processing. That is, the erasure disable mode is set. If the command is judged to be print command 11a in step S63, however, i.e., command code "FF" (hexadecimal 0CH), then the image buffer is cleared in step S66 upon completion of print processing in step S65.

Therefore, since image buffer 7a is cleared after printing the print data of one page, for example, in printing using command code "FF," when the user wants to print different characters each page, a noiseless printing result can be obtained with the transmission and development of a small amount of print data as described above when this print command is used.

In printing using control code "ESC FF," however, the data of one page is printed as when the control code "FF" is used, but image buffer 7a is not cleared after print processing. That is, this command is used when a plurality of copies of the same printing are required, and by receiving the control code "ESC FF" from host device 1 the same number of times as the number of copies required, it is not necessary for host device 1 to send the print data or for printer 3 to generate the print image data since the print image data are already developed in the image buffer.

Figure 7:
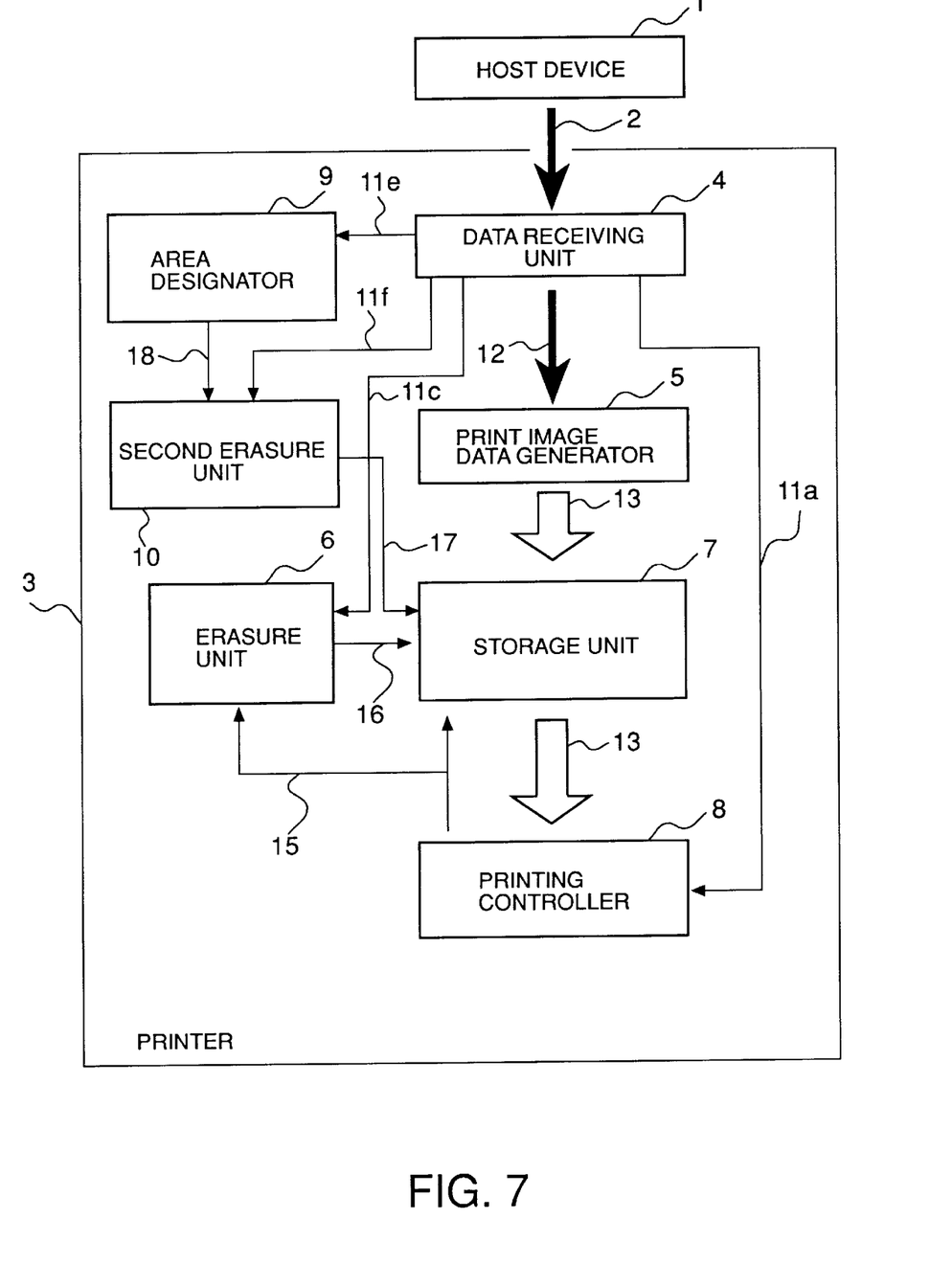
FIG. 7 is a functional block diagram of a printing apparatus according to the third embodiment of the present invention.
Figure 10:
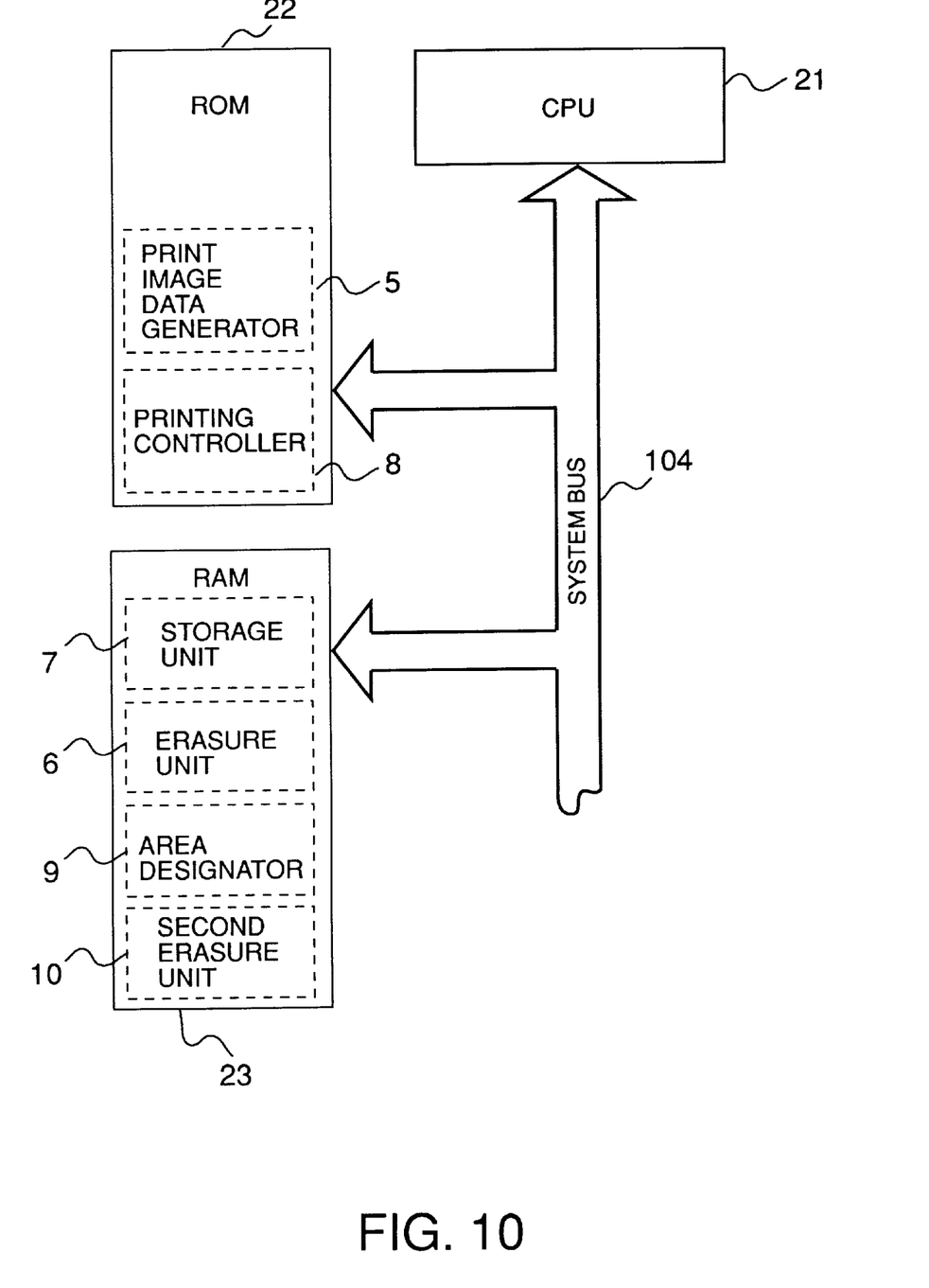
FIG. 10 is a more detailed partial block diagram illustrating functional unit placement of the printing apparatus of FIG. 7 within the printer memories of FIG. 2.

Next is an explanation of the third embodiment of the present invention referring to FIGS. 7, 8 and 10. FIG. 7 is a functional block diagram of the third embodiment of the present invention. An area designator 9 and second erasure unit 10 are added to the functional block diagram of the first embodiment. FIG. 10 shows the placement of these components within RAM 22 and/or ROM 23 according to this embodiment.

Area designator 9 designates an area in image buffer 7a of storage unit 7 in accordance with command lie identified by data receiving unit 4, and designated area 18 is output to second erasure unit 10. Second erasure unit 10 outputs erasure request 17 for the area in image buffer 7a corresponding to designated area 18 to storage unit 7 in accordance with command 11f identified by data receiving unit 4. Erasure request 17 differs from erasure request 16 in that it is output irrespective of completion of the print processing. Thus, part of the image buffer can be erased and rewritten prior to print processing. The rewriting operation is explained in detail below using the example of FIG. 8.

In this example, the print data "3" in the last line is to be counted up to "4" and "5" in subsequent printing. In a conventional system, each time one page is printed, the memory is initialized and the host computer must send the following print data and format control codes again "A, B, C, D, E, LF, F, G, H, I, J, LF, K, L, M, N, O, LF, P, Q, R, S, T, LF, U, V, W, X, Y, LF, Z, 0, 0, 0, 4, FF." It takes much time for the host device to send this data and it takes substantial time to develop the print data, resulting in a less than efficient use of computing resources.

By contrast, after printing the following, in the printer of the third embodiment, the host computer sends the control command "ESC W x y "Δx" "Δy" after which the area of the hatched part is cleared in response to another control command "CAN" also sent from the host device.

| A | B | C | D | E |
|---|---|---|---|---|
| F | G | H | I | J |
| K | L | M | N | O |
| P | Q | R | S | T |
| U | V | W | X | Y |
| Z | 0 | 0 | 0 | 3 |

Here, "ESC W" is a control command that sets the area, and when expressed in hexadecimal notation, "ESC" becomes 1BH and "W" becomes 57H. "x y Δx Δy" are parameters for the "ESC W" command, where "x y" are the base coordinates in the horizontal direction and the vertical direction set for the change area, and "Δx Δy"indicate the distances in the respective (or size) horizontal vertical directions for the change area. Processing of this command corresponds to area designator 9 in the function block in FIG. 7.

"CAN" is a command that clears the designated area and is 18H in hexadecimal notation. Processing of this command is equivalent to first erasure unit 10 of the function block.

Further, if the host computer sends the print data "4" and information on the position where it should be printed after clearing inside the area, incremented printing can thus be performed by merely developing one character in image buffer 7a. By repeating this operation, the smallest necessary amount of data can be sent and print data developed while the character data "3" on the last line is incremented to "4" and "5," thus making it possible to offer a high-throughput printer, even where some data modification is required.

As described herein above, the first and second embodiments are not provided with the area designator means and the second erasure unit of the third embodiment. Under certain circumstances these first and second embodiments also allow repeated printing of only partially changed print images or outputs without requiring the whole image buffer to be rewritten.

In FIG. 8, the white area larger square represents white or "0" pixels the black lines which forms the characters and numbers represent black or "1" pixels in the image buffer. When the image buffer has been cleared, namely the image data has been erased, all pixels are "0" pixels. Therefore, when image data are subsequently written into the image buffer, it is sufficient to write only "1" pixels at the respective positions while "0" pixels need not be written. As will be understood, if only "1" pixels are written into the image buffer without clearing it before, old and new image data may be superposed.

On the other hand, if the pixel pattern employed to overwrite a certain part of the image buffer such as the hatched area includes both "1" and "0" pixels, the previous image pattern in that part will be replaced by the new pattern.

Thus, in the latter case, the host device can replace characters or numbers by simply sending the new ones after designating respective positions without sending whole data necessary for generating the new printing image or output. In this case, the third embodiment is particularly effective for erasing an area which is difficult to designate by an unit of character size.

While the invention has been explained herein above with reference to the development of character codes or graphic language data into print image data, it is to be noted that the invention is also applicable to cases where print image data are generated in the host device and sent to the printing apparatus. The printing apparatus then stores the image data in the image buffer without performing developing. Irrespective of whether character codes or print image data are transferred from the host device, however, the present invention reduces the amount of data necessary to be transferred in all cases where the same or only partially different print image data are to be printed in more than one printing job.

While the invention has been described in conjunction with several specific embodiments, it is evident to those skilled in the art that many further alternatives, modifications and variations will be apparent in light of the foregoing description. For example, placement of certain processing threads such as erasure unit 6 in RAM 23, and print image data generator 5 in ROM 22 is a matter of design choice and may be provided in alternative memory structures such as floppy 101 and/or external store 100, as will become apparent to those ordinarily skilled in the art. Thus, the invention described herein is intended to embrace all such alternatives, modifications, applications and variations as may fall within the spirit and scope of the appended claims.

What is claimed is:

1. A printing apparatus, comprising:
   a storage unit to store print image data based on print data received from a host device;
   a print controller in communication with said storage unit to develop an image on a recording medium based on the print image data stored in the storage unit in response to one of a first predetermined control command and a second predetermined control command received from the host device; and
   a first erasure unit in communication with said storage unit and said print controller to selectively flush the print image data stored in said storage unit after said print controller has developed the image on the recording medium based on the print image data, wherein said first erasure unit is one of:
   (1) enabled, in response to said first predetermined control command, to flush the print image data; and
   (2) disabled, in response to said second predetermined control command, to not flush the print image data.

2. The printing apparatus of claim 1, further comprising;
   an area designator in communication with said storage unit to designate an erasable portion of said storage unit in accordance with a third predetermined control command received from the host device; and
   a second erasure unit to flush the print image data stored in said erasable portion of said storage unit designated by said area designator in accordance with a fourth predetermined control command.

3. A printing method, comprising:
   (a) receiving print data from a host device;
   (b) receiving at least one control command from the host device;
   (c) storing print image data based on the print data received in step (a);
   (d) developing an image on a recording medium based on the print image data stored in step (c) in response to one of a first predetermined control command and a second predetermined control command received in step (b);
   (e) selectively flushing the print image data stored in step (c) after completion of step (d),
   (f) enabling the flushing of the print image data in step (e) in response to the first predetermined control command; and
   (g) disabling the flushing of the print image data in step (e) in response to the second predetermined control command.

4. The printing method of claim 4, further comprising the steps of:
   (h) designating an erasable portion of the image data stored in step (c) in accordance with a third predetermined control command received in step (b); and
   (i) flushing the erasable portion of the print image data designated in step (h) in accordance with a fourth predetermined control command received in step (b).

5. An article of manufacture, comprising a computer usable medium having readable code means embodied therein for use with a recording device having a storage unit interfacing with a host device to receive at least one of print data and control commands therefrom, the computer readable program code means comprising:
   computer readable program code means for storing print image data in the recording device storage unit based on the print data received from the host device;
   computer readable program code means for developing an image on a recording medium based on the print image data stored in the recording device storage unit in response to one of a first predetermined control command and a second predetermined control command received from the host device;
   computer readable program code means for selectively flushing the print image data stored in the recording device storage unit after the image is developed by said developing code means;
   computer readable program code means for enabling said flushing code means in accordance with said first predetermined control command; and
   computer readable program code means for disabling said flushing code means in accordance with said second predetermined control command.

6. The article of claim 5, further comprising:
   computer readable program code means for designating an erasable portion of the image data stored in the recording device storage unit in accordance with a third predetermined control command received from the host device; and computer readable program code means for flushing the erasable portion of the print image data designated by said designating code means in accordance with a fourth predetermined control command received from the host device.

7. A printing apparatus, comprising:

a memory including a storage unit for storing print image data based on print data received from a host device; and a print controller in communication with said memory for developing an image on a recording medium based on the print image data stored in said memory storage unit in response to one of a first predetermined control command and a second predetermined control command received from the host device, said print controller comprising:
an information processor; and
first processor readable program code means residing in said memory, said first program code means causing said information processor to selectively flush the print image data stored in said memory storage unit after image development, wherein said first program code means is one of:
(1) enabled in response to said first predetermined control command; and
(2) disabled in response to said second predetermined control command.

8. The printing apparatus according to claim 7, further comprising:

second processor readable program code means residing in said memory for causing said information processor to designate an erasable portion of said memory storage unit in accordance with a third predetermined control command received from the host device; and third processor readable program code means residing in said memory for causing said information processor to flush the print image data stored in said erasable portion of said memory storage unit designated by said second program code means in accordance with a fourth predetermined control command received from the host device.

9. A printing apparatus, comprising:

a storage unit to store print image data based on print data received from a host device;

a print controller in communication with said storage unit to develop an image on a recording medium based on the print image data stored in said storage unit in response to one of a first predetermined control command and a second predetermined control command received from the host device; and a mode selector to determine a mode of the printing apparatus as one of:
(1) a first mode, in response to the first predetermined control command, in which the print image data stored in said storage unit is flushed after said print controller has developed the image on the recording medium based on the print image data; and
(2) a second mode, in response to the second predetermined control command, in which the print image data stored in said storage unit is not flushed after said print controller has developed the image on the recording medium based on the print image data.

10. A printing apparatus, comprising:

a storage unit to store print image data based on print data received from a host device;

a print controller in communication with said storage unit to develop an image on a recording medium based on the print image data stored in the storage unit in response to one of a first predetermined control command and a second predetermined control command received from the host device; and a first erasure unit in communication with said storage unit and said print controller to selectively clear out the print image data stored in said storage unit after said print controller has developed the image on the recording medium based on the print image data, wherein said first erasure unit is one of:
(1) enabled to clear out the print image data in response to said first predetermined control command; and
(2) disabled to not clear out the print image data in response to said second predetermined control command.

11. The printing apparatus according to claim 10, further comprising:

an area designator in communication with said storage unit to designate an erasable portion of said storage unit in accordance with a third predetermined control command received from the host device; and a second erasure unit to clear out the print image data stored in said erasable portion of said storage unit designated by said area designator in accordance with a fourth predetermined control command.

12. A printing method, comprising:

(a) receiving print data from a host device;
(b) receiving at least one control command from the host device;
(c) storing print image data based on the print data received in step (a);
(d) developing an image on a recording medium based on the print image data stored in step (c) in response to one of a first predetermined control command and a second predetermined control command received in step (b);
(e) selectively clearing out the print image data stored in step (c) after completion of step (d);
(f) enabling the clearing out of the print image data in step (e) in response to the first predetermined control command; and
(g) disabling the clearing out of the print image data in step (e) in response to the second predetermined control command.

13. The printing method according to claim 12, further comprising the steps of:

(h) designating an erasable portion of the image data stored in step (c) in accordance with a third predetermined control command received in step (b); and
(i) clearing out the erasable portion of the print image data designated in step (h) in accordance with a fourth predetermined control command received in (b).

14. An article of manufacture, comprising a computer usable medium having readable code means embodied therein for use with a recording device having a storage unit interfacing with a host device to receive at least one of print data and control commands therefrom, the computer readable program code comprising:

computer readable program code means for storing print image data in the recording device storage unit based on the print data received from the host device;

computer readable program code means for developing an image on a recording medium based on the print image data stored in the recording device storage unit in response to one of a first predetermined control command and a second predetermined control command received from the host device;

computer readable program code means for selectively clearing out the print image data stored in the recording device storage unit after the image is developed by said developing code means;

computer readable program code means for enabling said clearing out code means in accordance with said first predetermined control command; and computer readable program code means for disabling said clearing out code means in accordance with said second predetermined control command.

15. The article of claim 14, further comprising:

computer readable program code means for designating an erasable portion of the image data stored in the recording device storage unit in accordance with a third predetermined control command received from the host device; and computer readable program code means for clearing out the erasable portion of the print image data designated by said designating code means in accordance with a fourth predetermined control command received from the host device.

16. A printing apparatus, comprising:

a memory including a storage unit for storing print image data based on print data received from a host device; and a print controller in communication with said memory for developing an image on a recording medium based on the print image data stored in said memory storage unit in response to one of a first predetermined control command and a second predetermined control command received from the host device, said print controller comprising:

an information processor; and first processor readable program code means residing in said memory, said first program code means causing said information processor to selectively clear out the print image data stored in said memory storage unit after image development, wherein said first program code means is one of:

(1) enabled in response to said first predetermined control command; and (2) disabled in response to said second predetermined control command.

17. The printing apparatus according to claim 16, further comprising:

second processor readable program code means residing in said memory for causing said information processor to designate an erasable portion of said memory storage unit in accordance with a third predetermined control command received from the host device; and third processor readable program code means residing in said memory for causing said information processor to clear out the print image data stored in said erasable portion of said memory storage unit designated by said second program code means in accordance with a fourth predetermined control command received from the host device.

18. A printing apparatus, comprising:

a storage unit to store print image data based on print data received from a host device;

a print controller in communication with said storage unit to develop an image on a recording medium based on the print image data stored in said storage unit in response to one of a first predetermined control command and a second predetermined control command received from the host device; and a mode selector to determine a mode of the printing apparatus as one of:

(1) a first mode, in response to the first predetermined control command, in which the print image data stored in said storage unit is cleared out after said print controller has developed the image on the recording medium based on the print image data; and (2) a second mode, in response to the second predetermined control command, in which the print image data stored in said storage unit is not cleared out after said print controller has developed the image on the recording medium based on the print image data.

* * * * *

UNITED STATES PATENT AND TRADEMARK OFFICE
CERTIFICATE OF CORRECTION

| | |
|---|---|
| PATENT NO. | : 6,031,976 |
| APPLICATION NO. | : 08/729267 |
| DATED | : February 29, 2000 |
| INVENTOR(S) | : Naohiko Koakutsu et al. |

It is certified that error appears in the above-identified patent and that said Letters Patent is hereby corrected as shown below:

Column 10, line 28, change "claim 4" to --claim 3--.

Signed and Sealed this

Seventh Day of August, 2007

JON W. DUDAS
*Director of the United States Patent and Trademark Office*